United States Patent
Yun

(10) Patent No.: US 6,387,464 B1
(45) Date of Patent: *May 14, 2002

(54) DEVICE AND METHOD FOR CONTROLLING FERMENTATION AND ENSILAGATION OF FOOD

(75) Inventor: Kwang Hyun Yun, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

This patent is subject to a terminal disclaimer.

(21) Appl. No.: 08/113,310

(22) Filed: Aug. 30, 1993

Related U.S. Application Data

(63) Continuation of application No. 07/738,122, filed on Jul. 30, 1991, now Pat. No. 5,240,721.

(30) Foreign Application Priority Data

Aug. 16, 1990 (KR) .............................. 90-12619

(51) Int. Cl.[7] .................................. A23B 7/10
(52) U.S. Cl. ...................... 428/49; 428/31; 99/468; 99/472
(58) Field of Search .................... 426/18, 31, 49, 426/54; 99/468, 472

(56) References Cited

U.S. PATENT DOCUMENTS

| | | | | |
|---|---|---|---|---|
| 3,875,304 A | * | 4/1975 | Hunt et al. | 426/31 |
| 3,926,738 A | | 12/1975 | Wilson et al. | |
| 4,015,018 A | * | 3/1977 | Glabe et al. | 426/54 |
| 4,292,331 A | * | 9/1981 | Ostre | 426/52 |
| 4,293,655 A | | 10/1981 | Christ et al. | |
| 4,311,088 A | * | 1/1982 | Höhn et al. | 426/18 |
| 4,349,570 A | * | 9/1982 | Segard et al. | 426/54 |
| 4,503,079 A | * | 3/1985 | King et al. | 426/54 |
| 4,751,089 A | * | 6/1988 | Heikonen et al. | 426/54 |
| 4,822,620 A | * | 4/1989 | Chamberlain et al. | 426/54 |
| 4,859,485 A | * | 8/1989 | Linton et al. | 426/31 |
| 4,938,972 A | * | 7/1990 | Moo-Young et al. | 426/31 |
| 4,981,705 A | * | 1/1991 | Tomes | 426/54 |
| 5,019,972 A | * | 5/1991 | Rim | 99/468 |
| 5,082,675 A | * | 1/1992 | Jackson et al. | 426/54 |
| 5,240,721 A | | 8/1993 | Yun | |
| 5,351,745 A | * | 10/1994 | Park | 99/468 |

\* cited by examiner

*Primary Examiner*—James Hook
(74) *Attorney, Agent, or Firm*—Robert E. Bushnell, Esq.

(57) ABSTRACT

A device for controlling fermentation and ensilagation of food for use with an apparatus for fermenting and ensilaging is disclosed. The device comprising a key input unit manually controlled by a user so as to set the rate of fermentation and the ripeness stage. A microprocessor controls the respective units in accordance with a preset program and in response to signals representing the present rate of fermentation and ripeness setting provided by the key input unit. A load control unit controls a heating unit and a cooling unit in response to a control signal applied thereto from the microprocessor and representing the present rate of fermentation and the ripeness stage. A temperature detecting unit detects the present temperature inside an ensilaging container and outputs a signal representing the detected temperature to the microprocessor. A displaying unit displays the respective operational states of the units in response to signal applied thereto from the microprocessor, thereby providing a desired fermented state of the materials being ensilaged by controlling the fermenting time in accordance with the preset rate of fermentation and the ripeness stage, and dropping the temperature inside the ensilaging container in order to execute an ensilaging mode of an ensilaging stage of preset three stages after the fermentation has been accomplished.

14 Claims, 6 Drawing Sheets

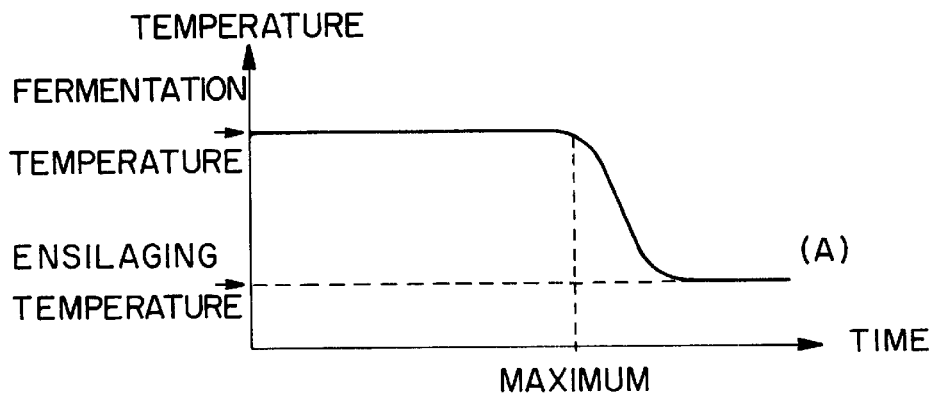
FIG. 2(A)
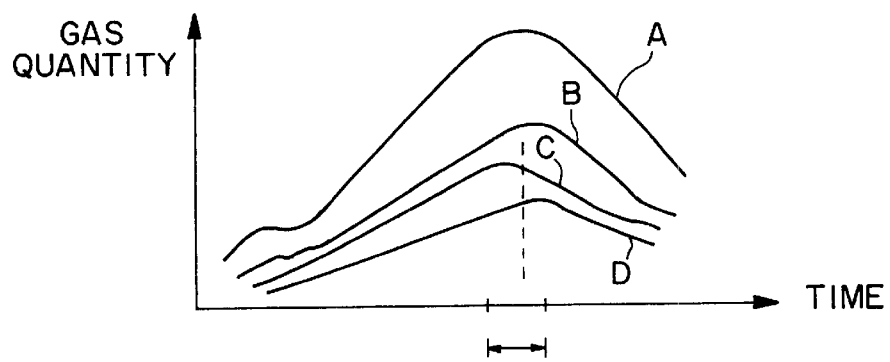
FIG. 2(B)
|  | 1ST RIP-ENESS | 2ND RIP-ENESS | OPTIMUM FERMEN-TATION | 3RD RIP-ENESS | 4TH RIP-ENESS |
|---|---|---|---|---|---|
| QUICK RATE (30°C) | 7 (NL$_1$) | 12 (NL$_2$) | 16HR(NL$_3$) | 20 (NL$_4$) | 25 (NL$_5$) |
| NORMAL RATE (25°C) | 13 (FL$_1$) | 18 (FL$_2$) | 22HR(FL$_3$) | 26 (FL$_4$) | 30 (FL$_5$) |
FIG. 3

DEVICE AND METHOD FOR CONTROLLING FERMENTATION AND ENSILAGATION OF FOOD

CROSS REFERENCE TO RELATED APPLICATIONS

This application is a continuation of and makes reference for the purpose of claiming the benefits available under 35 U.S.C. §§119 and 120, to my co-pending application entitled DEVICE AND METHOD FOR CONTROLLING FERMENTATION AND ENSILAGATION OF FOOD earlier filed in the United States Patent & Trademark Office on Jul. 30, 1991 and assigned Ser. No. 07/738,122, which issued on Aug. 31, 1993 as U.S. Pat. No. 5,240,721, and which in turn, claims priority under 35 U.S.C. §119 based upon my application previously filed on Aug. 16, 1990 in the Korea Industrial Property Office and assigned Ser. No. 1990/12619.

BACKGROUND OF THE INVENTION

1. Field of the Invention

The present invention relates to a device and method for controlling the fermentation and ensilagation of food capable of being so processed, and more particularly to a device and method for controlling fermentation and ensilagation for use with a container for fermenting and ensilaging. The device can control the fermented state of the food by changing the fermenting time, and lower the fermenting temperature inside the fermentation and ensilaging container to an ensilaging temperature in order to ensilage the fermented materials after a predetermined fermenting time.

2. Description of Background Art

Generally, food which is fermented tends to be easily acidified at the room temperature, but the ensilage of fermented material is relatively difficult.

As used herein, the term "ensilage" refers to the preservation or storage of food in a moist state as a result of acidification caused by the anaerobic fermentation of carbohydrates present in the food being treated.

The taste of the fermented material is significantly influenced by the degree of its fermentation. In the other words, a relatively high temperature causes fermentation at a faster rate but the taste of the fermented material deteriorates, while a relatively low temperature increases the time necessary for accomplishing desired fermentation. Additionally, when the fermenting temperature is frequently changed, the taste of the resulting fermented material is usually poor.

In a known apparatus for fermenting and ensilaging food, the amount of anaerobic carbon dioxide generated per unit time is monitored by a detecting and measuring device during the constant temperature fermentation process of the food contained in the ensilaging container. This type of fermenting and ensilaging apparatus allows the material being fermented for ensilagation to reach a stage at which the maximum amount of the anaerobic carbon dioxide is generated. This stage is considered as the optimum fermented stage. At this stage, the temperature inside the ensilaging container of the fermenting and ensilaging apparatus drops to the ensilaging temperature, thereby restricting further fermentation of the fermented material and keeping the fermented material cold.

This type of fermenting and ensilaging apparatus is provided with the monitoring device shown in FIG. 1 which is adapted for detecting and measuring the amount of anaerobic carbon dioxide generated per unit time.

The monitoring device has a very complex construction however, as illustrated in FIG. 1 so that it occupies considerable space inside the fermenting and ensilaging apparatus. Also, the monitoring device has another disadvantage in that a considerable amount of the generated carbon dioxide gas is exhausted out of the ensilaging container. This results in the dehydration and discoloration of the surface of the fermented material which further results in the lowering of the degree of freshness of the fermented material which in turn decreases the commercial value of the fermented material.

This type of device has still another disadvantage in that it initiates the cold ensilaging mode for the fermented material after reaching a particular fermentation state of the food, the so called optimum fermentation stage as determined by carbon dioxide output. That is, the device does not allow for any variation in the degree of fermentation of the food. Thus, the device can only provide for a single degree or stage of ripeness in the fermented material. That is the device cannot provide for a lesser degree of ripeness for those who prefer unripe material to ripe material.

U.S. Pat. No. 4,293,655 entitled *Apparatus For Ensilaging And Fermenting* is disclosed. This apparatus removes resulting anaerobic liquid from the bottom of the ensilaging container and recycles or distributes it onto top of the material being ensilaged in order to supply nutritive substance, anaerobes and moisture to the top of the material being ensilaged.

Thus, this type of apparatus prevents uneven fermentation and the deterioration of the freshness of the food being processed which is probably caused by the dehydration of the top of the material being ensilaged.

This type of fermenting and ensilaging apparatus however, has a disadvantage in that it fails to provide a device and method for controlling the fermented state of the material being ensilaged.

SUMMARY OF THE INVENTION

It is thus an object of the present invention to provide an improved device and method for controlling fermentation and ensilage for use with a container for fermenting and ensilaging food in which the above described disadvantages may be overcome and in which the ripeness stage for the material being ensilaged is controlled by varying the fermentation time at a predetermined temperature without the need of using a monitoring device for detecting and measuring the amount of anaerobic carbon dioxide generated during the process.

It is another object of the present invention to provide a device and method for controlling fermentation and ensilage for use with a container for fermenting and ensilaging in which the rate of fermentation and the stage of ripeness of the food may be freely selected by the user, respectively.

It is still another object of the present invention to provide a device and method for controlling fermentation and ensilagation for use with a container for fermenting and ensilaging in which the fermentation mode for the material being ensilaged is automatically converted to the ensilaging mode as the fermented state of said material being ensilaged is determined as a predetermined fermented state.

The above-mentioned objects of the present invention can be achieved by providing a device for controlling fermentation and ensilage for use in a container for fermenting and ensilaging.

The device according to the present invention comprises a key input unit adapted to be manually controlled by the user so as to set the rate of fermentation and the stage of ripeness desired, i.e., the degree of ripeness. A microprocessor controls the respective units in accordance with a preset program and in response to signals representing the present rate of fermentation and stage of ripeness provided by the key input unit. A load control unit controls a heating unit and a cooling unit in response to a control signal applied thereto representing the present rate of fermentation and stage of ripeness from the microprocessor. A temperature detecting unit detects the present temperature inside the ensilaging container and outputs a signal representing the temperature detected. A displaying unit displays the respective present operational states of the units in response to a signal applied thereto from the microprocessor, thereby providing the desired fermented state of the food by determining the rate of fermentation and the stage of ripeness.

In a further aspect of the present invention, the above-mentioned objects of the present invention can be achieved by a method for controlling the fermentation and ensilage in a container apparatus for fermenting and ensilaging. The method comprises the steps of first determining whether the present mode in the fermentation and ensilaging container is the fermentation mode. If the answer is "yes", i.e., if the contents of the container are in the fermentation mode, then it is determined whether the present rate of fermentation has been set as the "quick rate". If the "quick rate" fermentation rate has been set, the heating unit is powered in order to maintain the temperature inside the ensilaging container at 30° C. But, if the "quick rate" of fermentation has not been set, the temperature inside the ensilaging container is maintained at 25° C. If the answer is "no", i.e., the contents of the container are not in the fermentation mode, then the ensilaging mode is executed.

The ripeness stage is determined simultaneously with maintaining the fermenting temperature which is determined in the present mode determining step as the temperature inside the ensilaging container.

Then it is determined whether the predetermined fermenting time corresponding to the determined ripeness stage has lapsed. If it is determined that the predetermined fermenting time has lapsed, then the ensilaging mode is executed.

BRIEF DESCRIPTION OF THE DRAWINGS

The above and other objects, features and advantages of the present invention will be more clearly understood from the following detailed description taken in conjunction with the accompanying drawings, in which:

FIGS. 2A and 2B are graphs illustrating the fermenting temperature and the amount of generated carbon dioxide as a function of the time, respectively, thereby illustrating the relation therebetween;

FIG. 3 is a table illustrating the relation between the fermenting temperature and fermenting time in each stage of ripeness;

DETAILED DESCRIPTION OF PREFERRED EMBODIMENTS

Figure 1:
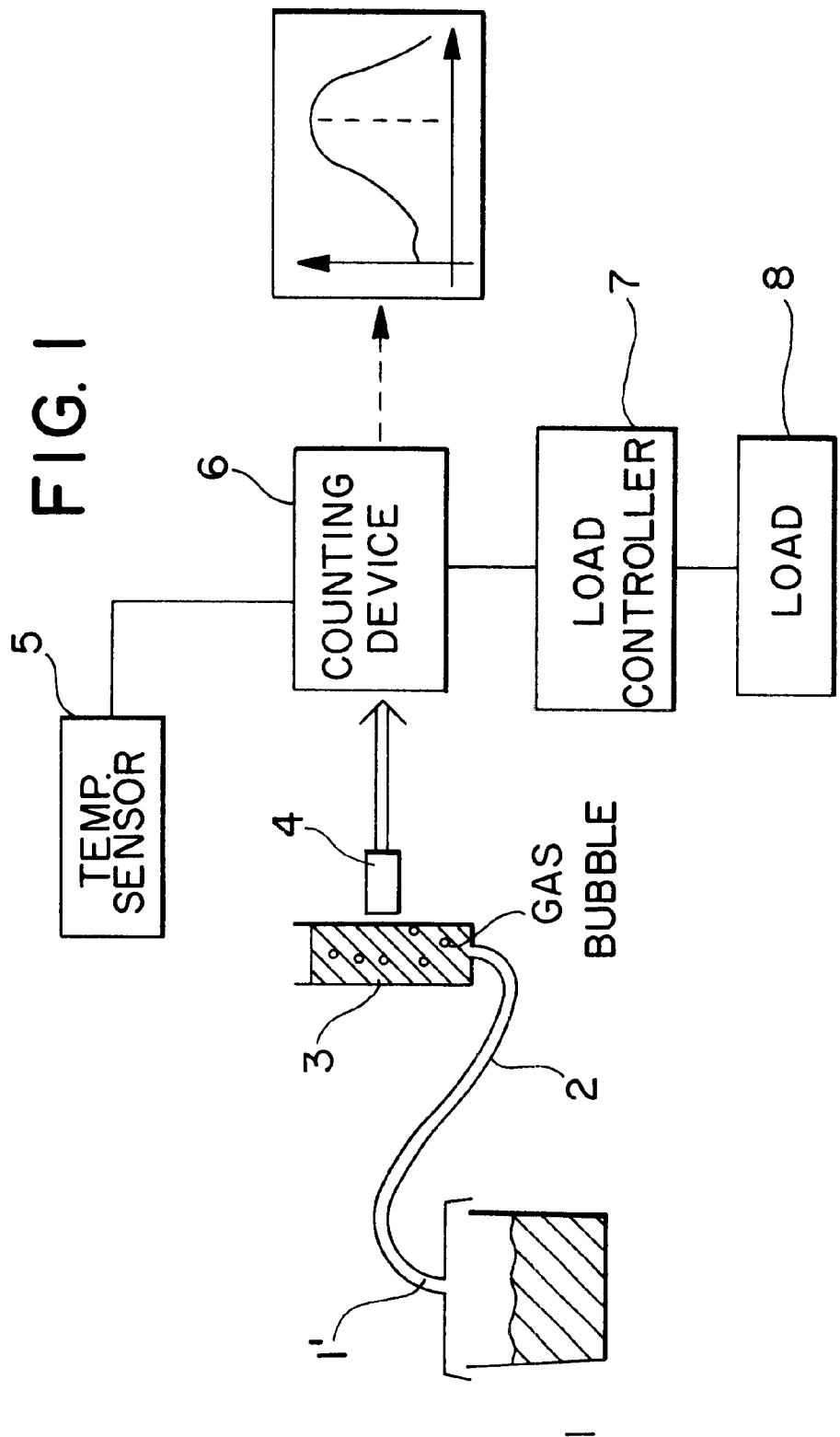
FIG. 1 is a schematic view illustrating the structure of a known device for monitoring the amount of anaerobic carbon dioxide generated in a fermenting and ensilaging apparatus.

Referring now to the drawings, FIGS. 2A and 2B are graphs which illustrate the relation between the fermenting temperature and the amount of carbon dioxide generated. It is shown that the maximum amount of carbon dioxide generated is generated in about the same time without regard to the amount of the material being ensilaged. There is a difference however, between the respective amounts of carbon dioxide generated by a large amount of the material being ensilaged (the curve A in FIG. 2B) and by smaller amounts of the material being ensilaged (the curves B to D in FIG. 2B).

In the same manner, the times needed to generate the maximum amount of carbon dioxide are, as represented at the respective curves B to D of FIG. 2B, essentially equal to one another even when the material and the dressing materials are substituted by the others, while the amounts of carbon dioxide generated are different from one another.

Therefore, most of the food being ensilaged, such as pickled vegetables, can achieve the most proper degree of fermentation when fermented for a specific period of time at an optimum temperature.

Figure 4:
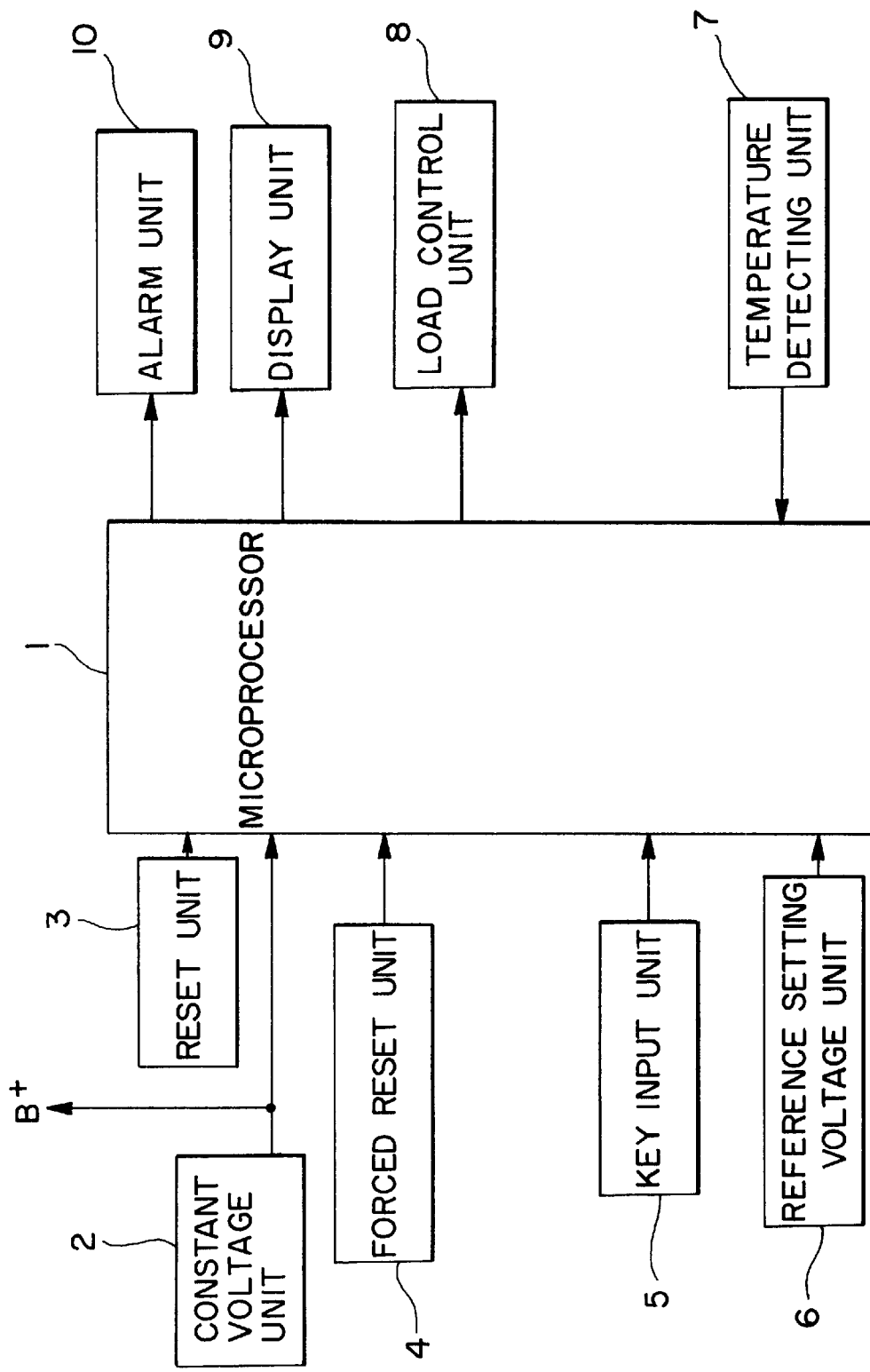
FIG. 4 is a block diagram illustrating the construction of a device for controlling a fermenting and ensilaging apparatus in accordance with this invention.

Taking notice of the above aspect and referring now to FIG. 4, the present invention can thus accomplish its above-mentioned objects by providing a control device comprising a key input unit 5, a temperature detecting unit 7, a load control unit 8, for driving a compressor, a fan motor, and a heating unit, and a microprocessor 1 for controlling said units in accordance with a preset program.

FIG. 4 is a block diagram illustrating the construction of a device for controlling a fermenting and ensilaging containing apparatus in accordance with the present invention.

The control device comprises a microprocessor 1 for controlling the respective units in accordance with a preset program for fermenting and ensilaging the foods being ensilaged, and a constant voltage unit 2 for rectifying AC power and supplying the rectified AC power to the respective units of control circuit as an operational power, a reset unit 3, a forced reset unit 4, a key input unit 5, a reference voltage setting unit 6, a temperature detecting unit 7, a load control unit 8, a display unit 9 and an alarm unit 10.

Thus the reset unit 3 is used for resetting the microprocessor 1 at the initial moment of applying operational power to the respective units of the control circuit. The forced reset unit 4 is used for forcibly resetting the microprocessor 1 in case of an overload, an operational mis-step or error. The key input unit 5 includes, at least, a fermentation speed select key, a ripeness stage select key, and an ensilaging temperature select key and which is adapted for being manually operated in order to output respective operational commands to the microprocessor 1. The reference voltage setting unit 6 supplies an analog to digital conversion reference voltage to the microprocessor 1.

The control device according to this invention also includes temperature detecting unit 7 for detecting the temperature inside the ensilaging container and outputting a signal representing said detected temperature to the microprocessor 1. The load control unit is used for driving a compressor, a fan motor, a heating unit and the like under control of the microprocessor 1. The display unit 9 displays the respective operational states of the units under control of the microprocessor 1. The alarm unit 10 powers an audible buzzer or light under control of the microprocessor 1 in order to inform the operator of the respective operational functions of the units or the accomplishment of a desired step, such as fermentation or the like.

FIG. 3 is a table illustrating the relation between fermenting temperature and fermenting time in each stage of ripeness.

As illustrated, the rate of fermentation is divided into two rates, a "normal rate" and a "quick rate". In the normal rate the fermenting temperature is maintained at 25° C., while in the quick rate the fermenting temperature is maintained at 30° C.

Also, the stage or degree of ripeness is divided into five different stages, and the fermenting time in the respective stages is set so as to be different from one another.

Figure 5A:
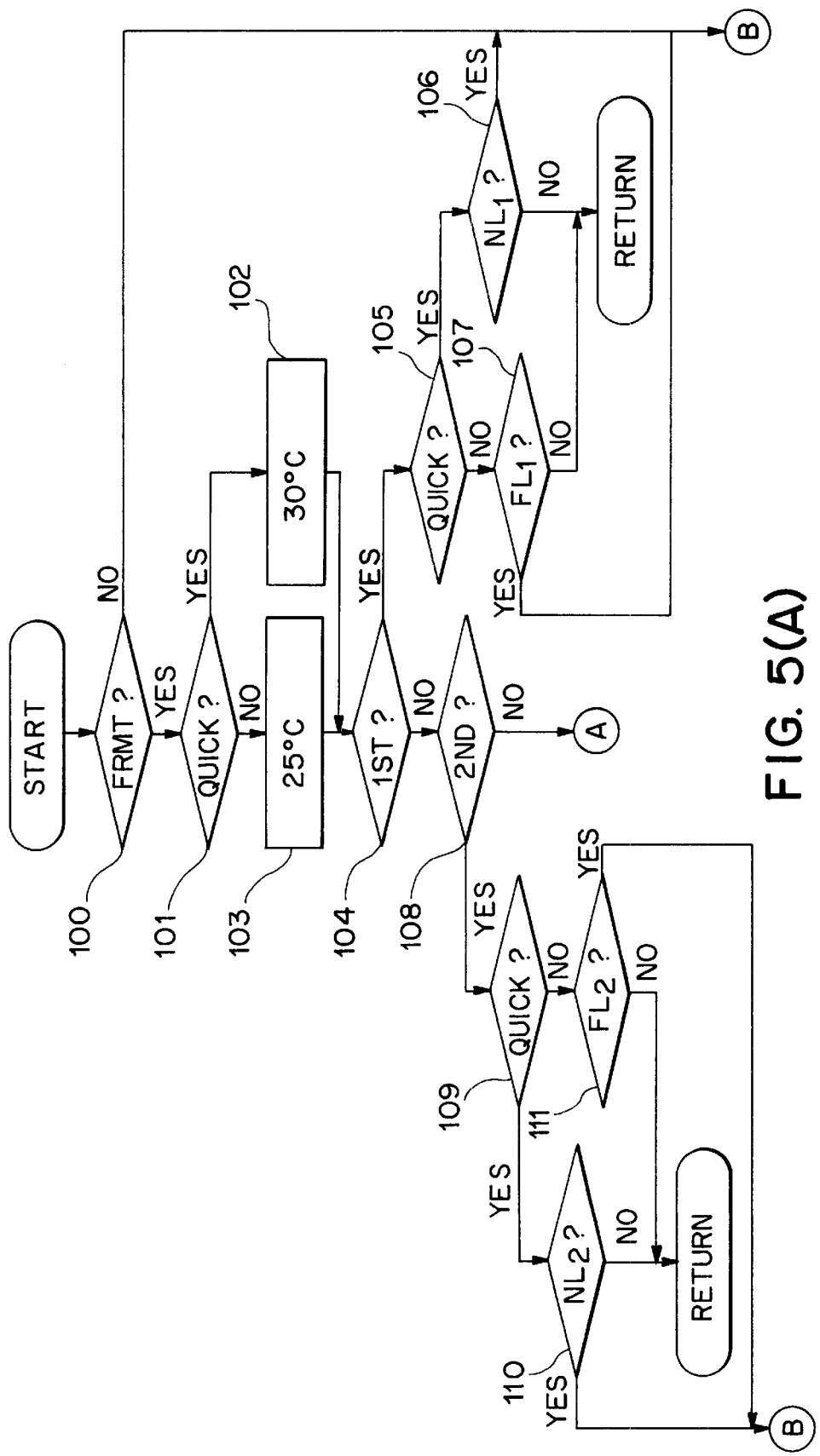
FIGS. 5A to 5C each is a flow diagram illustrating operations executed by a microprocessor of the control device of FIG. 4.
Figure 5B:
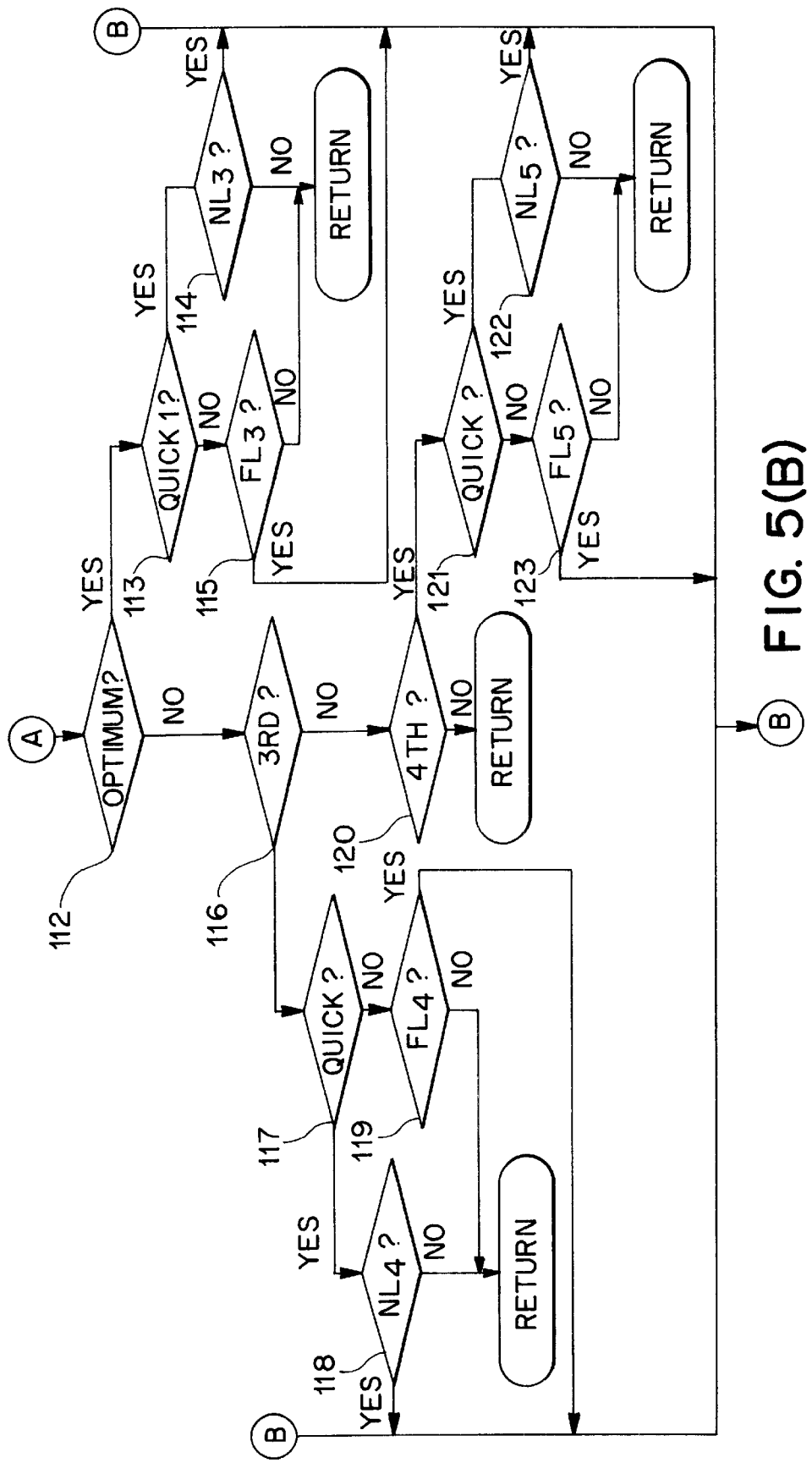
Figure 5C:
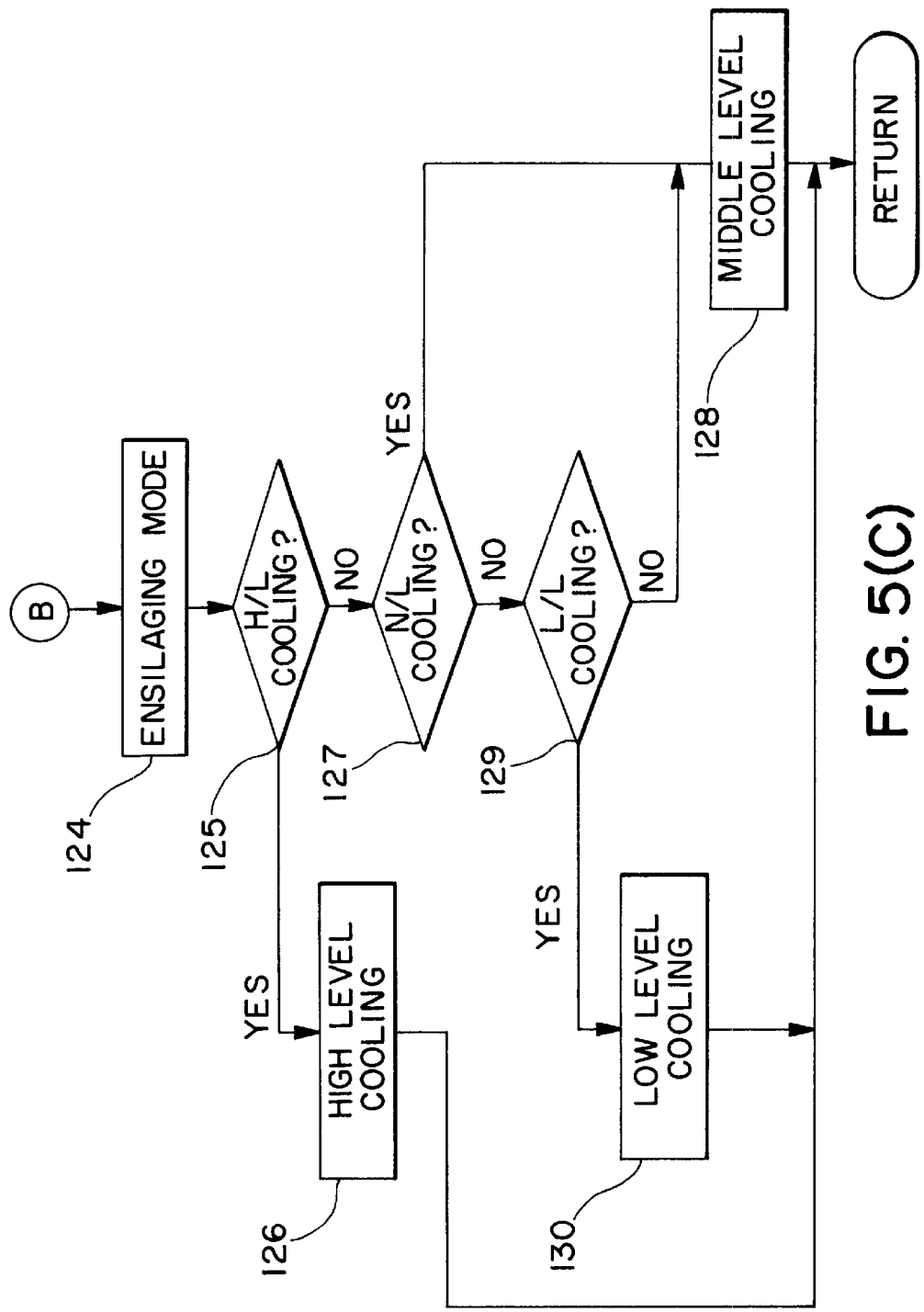

The method for controlling the device in accordance with this invention in accordance with the five stages of ripeness stages is schematically illustrated in a flow diagram of FIG. 5. Here, it should be understood that the number of ripeness stages, the fermenting temperature and the fermenting time can be changed as desired.

The microprocessor 1 first determines at inquiry step 100 whether the present mode is the fermentation mode. If the answer is "no", the microprocessor 1 directly executes step 124 in which the ensilaging mode is executed.

If the answer is "yes", i.e., the present mode is the fermentation mode, it executes the next inquiry step 101 in which it is determined whether the present rate of fermentation has been set as the "quick rate". If "quick rate" fermentation has been set, the microprocessor 1 executes step 102 in which the heating unit is powered in order to maintain the temperature inside the ensilaging container at 30° C. But, if the "quick rate" of fermentation has not been set, the temperature inside the ensilaging container is maintained at 25° C. at step 103.

Thereafter, the microprocessor 1 executes the next inquiry step 104 in which it is determined whether the stage of ripeness has been selected as a first ripeness stage. If it is determined that the first ripeness stage has been selected, the microprocessor 1 executes the next inquiry step 105 in which it is determined whether the "quick rate" of fermentation has been selected. If the answer is "yes", it is determined at the next inquiry step 106 whether a fermenting time $NL_1$ has lapsed. If the time $NL_1$ has not lapsed, the microprocessor 1 allows the fermentation mode to continue. If the time $NL_1$ has lapsed, the fermentation mode is converted into the ensilaging mode.

On the other hand, if the answer at the inquiry step 105 is "no", that is the "quick rate" of fermentation has not been selected, it is determined at step 107 whether a fermenting time $FL_1$ has lapsed. If the answer is "yes", the fermentation mode is converted into the ensilaging mode.

If the answer at the step 104 is "no", i.e., the first ripeness stage was not selected, the microprocessor 1 executes inquiry step 103 in which it is determined whether a second ripeness stage has been selected. If the second ripeness stage has been selected, the microprocessor 1 sequentially executes steps 109 and either 110 or 111 in order to determine whether the "quick rate" of fermentation has been selected and fermenting times $FL_2$ or $NL_2$ have lapsed as described in the above first ripeness stage. Thereafter, the fermentation mode is converted into the ensilaging mode.

At step 112, if it is determined that the optimum fermentation ripeness stage has been selected, the microprocessor 1 sequentially executes steps 113 and either 114 or 115 in order to determine whether the quick rate of fermentation has been selected and fermenting times $FL_3$ or $NL_3$ have lapsed. At step 116, if it is determined that a 3rd ripeness stage has been selected, the microprocessor 1 executes steps 117 and either 118 or 119 in order to determine whether the quick rate of fermentation has been selected and fermenting times $FL_4$ and $NL_4$ have lapsed.

On the other hand, at step 120, if it is determined that a 4th ripeness stage has been selected, the microprocessor 1 sequentially executes steps 121 and either 122 or 123 in order to determine whether the quick rate of fermentation has been selected and fermenting times $FL_5$ or $NL_5$ have lapsed. If any of the above determinations indicate one of the fermenting times have elapsed, at step 124 the fermentation mode is converted into the ensilaging mode.

At inquiry step 125, the microprocessor 1 determines whether the ensilaging temperature has been selected as "high level cooling". If the answer is "yes", at step 126 the compressor is powered in order to maintain the temperature inside the ensilaging container at a predetermined high level cooling temperature. At inquiry step 127 however, if it is determined that the ensilaging temperature has been selected as "middle level cooling", at step 128 the compressor is powered in order to maintain a predetermined middle level cooling temperature as the temperature inside the ensilaging container. Also, at inquiry step 129 if it is determined that the ensilaging temperature has been selected as "low level cooling", at step 130 the compressor is powered in order to maintain a predetermined low level cooling temperature as the temperature inside the ensilaging container. However, if at the inquiry step 129 the answer is "no", that is an ensilaging temperature has not been selected, the microprocessor 1 executes the step 128 in which the compressor is powered in order to maintain a predetermined middle level cooling temperature as the temperature inside the ensilaging container.

As described above, the device controlling fermentation and ensilage for fermenting and ensilaging apparatus in accordance with the present invention can ferment materials being ensilaged by simple control for the fermenting time by means of a software under a constant temperature in the ensilaging container, thereby providing an advantage in that the internal construction of the fermenting and ensilaging apparatus accomplishes compactness. Furthermore, the control device according to the present invention provides another advantage in that it has no necessity of exhausting the anaerobic carbon dioxide out of the ensilaging container so that the freshness of the materials being ensilaged does not deteriorate, thereby improving the taste of said materials. Also it is possible to allow the stage of ripeness of the materials to be freely selected in order to satisfy any taste of a person.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A method for controlling an apparatus for anaerobic fermenting and ensilaging of a food material, said method comprising the steps of:

selecting a ripeness setting;

maintaining a constant fermenting temperature inside an anaerobic fermenting and ensilaging container for a predetermined fermenting time corresponding to a selected said ripeness setting;

determining whether said predetermined fermenting time corresponding to the selected ripeness setting has lapsed; and executing an ensilaging mode when said predetermined fermenting time has lapsed, wherein the ripeness of the food material is controlled by varying only fermentation time at predetermined temperatures.

2. The method of claim 1, wherein said predetermined fermenting time is determined only by the ripeness setting selected and said constant fermenting temperature.

3. The method of claim 1, further comprising:

receiving said selected ripeness setting in an input means;

automatically maintaining said constant temperature by generating control signals in a computer control means, said computer control means determining whether said predetermined fermenting time corresponding to said ripeness setting received by said input means has lapsed, and executing said ensilaging mode when said predetermined fermenting time has lapsed; and controlling a compressor, a fan, and a heating unit affecting the temperature within the anaerobic fermenting and ensilaging container using a load control means in response to said control signals.

4. The method of claim 1, said step of executing an ensilaging mode comprising reducing said constant fermenting temperature inside the anaerobic fermenting and ensilaging container to an ensilaging temperature restricting further fermentation of the food material.

5. The method of claim 1, further comprised of automatically performing said steps of maintaining a constant fermenting temperature, determining whether a fermenting time has lapsed and executing an ensilaging mode, under computer control in accordance with a preset program.

6. The method of claim 1, further comprising selecting a rate of fermentation determinative of said constant fermenting temperature.

7. The method of claim 6, further comprising maintaining said constant fermenting temperature at approximately 25° C. when a first rate of fermentation is selected, and maintaining said constant fermenting temperature at approximately 30° C. when a second rate of fermentation is selected.

8. A method for controlling anaerobic fermentation and ensilagation of a food material, comprising:

determining whether a present mode is a fermentation mode, when said present mode is said fermentation mode determining a user selected ripeness setting and maintaining a fermenting and ensilaging container at a constant temperature for a predetermined fermenting time corresponding to said user selected ripeness setting; and executing an ensilaging mode when a said predetermined fermenting time has lapsed and when said present mode is determined not to be said fermentation mode, the ripeness of the food material being controlled by varying only fermentation time at constant temperatures.

9. A method for controlling anaerobic fermentation and ensilagation of a food material within a fermenting and ensilaging container, comprising:

determining a user selected ripeness setting;

maintaining said fermenting and ensilaging container at a constant temperature encouraging fermentation of the food material, for a predetermined time corresponding to said user selected ripeness setting; and executing an ensilaging mode when a said predetermined time has lapsed, the ripeness of the food material being controlled by varying only fermentation time at constant temperatures.

10. The method of claim 9, comprising selecting said constant temperature in accordance with a desired rate of fermentation.

11. The method of claim 9, wherein said ripeness setting determines the length of the fermentation time at a constant temperature encouraging fermentation.

12. The method claim 9, further comprising:

selecting a cooling level for said ensilaging mode from among a high level, a middle level and a low level; and maintaining the fermenting and ensilaging container at an ensilaging temperature corresponding to a selected said cooling level.

13. The method of claim 9, said step of executing an ensilaging mode comprising reducing the temperature of the anaerobic fermenting and ensilaging container from said constant temperature encouraging fermentation to an ensilaging temperature restricting further fermentation of the food material.

14. A method for controlling anaerobic fermentation and ensilagation of a food material in a container, comprising:

determining whether a present mode is a fermentation mode in accordance with a ripeness setting corresponding to a predetermined fermenting time at a predetermined fermenting temperature;

when said present mode is said fermentation mode maintaining the container at a said predetermined fermenting temperature; and when said present mode is not said fermentation mode, maintaining the container at an ensilaging temperature.

* * * * *